UNITED STATES PATENT OFFICE.

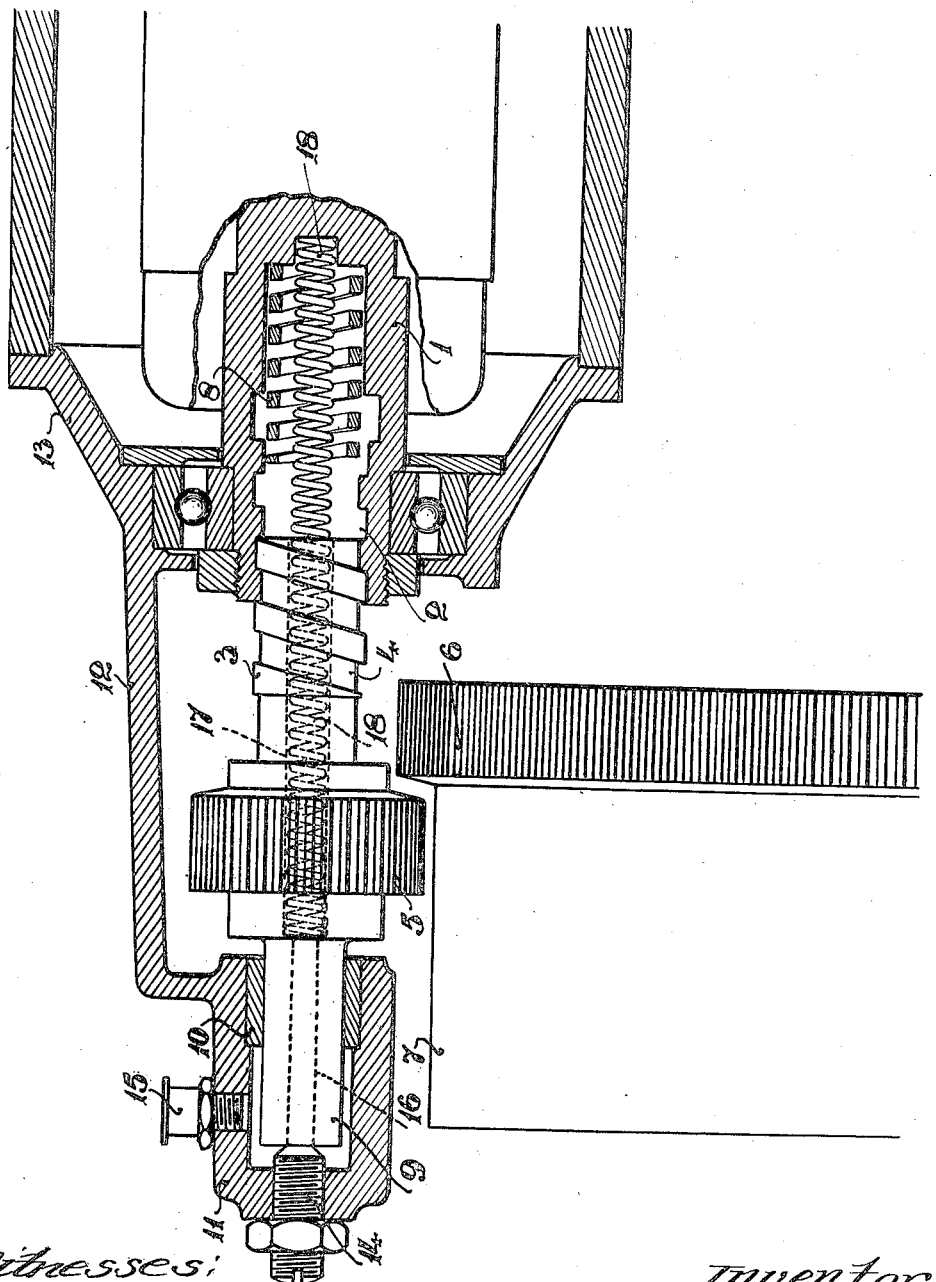

WILLIAM HOLT, OF BIRMINGHAM, ENGLAND, ASSIGNOR OF ONE-HALF TO BROLT LIMITED, OF BIRMINGHAM, ENGLAND.

ENGINE-STARTER.

1,373,330.   Specification of Letters Patent.   Patented Mar. 29, 1921.

Application filed January 5, 1920. Serial No. 349,562.

*To all whom it may concern:*

Be it known that I, WILLIAM HOLT, subject of the King of Great Britain, residing at Birmingham, England, have invented certain new and useful Improvements in Engine-Starters, of which the following is a specification.

This invention relates to engine starters of the kind comprising a hollow shaft, driven by an electric or other motor, and engaged by a spindle or extension carried by a gear wheel or pinion adapted, when the motor is started, to be moved axially into gear with a suitably driven member connected with the engine, by means of a projection or helical thread upon the said spindle or extension coöperating with a helical groove or slot around the interior of the hollow motor-driven shaft.

The principal objects of the present invention are to insure the pinion being moved into gear with the driven member in a quicker and more certain manner and with a smoother action; to provide for the better lubrication of the helical gear members; and to provide means for adjusting the amount of clearance between the pinion and the driven member when the said pinion is thrown out of gear.

According to the invention, the pinion is provided with a plain spindle extension upon its outer end, that is to say, upon the side opposite to that upon which the helical gear extension is provided, and this outer spindle is supported by and is adapted to slide within an end bearing carried by the frame of the machine, which insures the pinion moving smoothly into gear, while the friction set up by this outside bearing exerts a drag which causes the pinion quickly to commence its traversing movement. The pinion and spindle extensions are drilled right through, forming an oil-way leading to the bearing housing which is fitted with a suitable lubricator or oil cup, so that the oil can easily reach the helical gear; while in the end of the bearing housing is an adjustable screw stop which determines the clearance between the pinion and driven member in the out-of-gear position.

The accompanying drawing is a section partly in elevation showing the improvements which constitute the present invention.

The hollow end of the motor shaft 1 is provided internally with a helical groove 2 engaged by a helical thread 3 upon the spindle extension 4 of the toothed pinion 5, so that the rotation of the motor shaft causes the pinion 5 to move axially into gear with the toothed ring 6 on the engine fly-wheel 7, the end of the spindle 4 compressing a cushioning spring 18. According to the present invention the pinion 5 is provided, at its outer end, that is to say upon the side opposite to the spindle 4, with a cylindrical extension or short shaft 9 which is supported within a bearing bush 10 fitted within a housing 11 connected, by an arm or hood 12, with the body 13 of the motor, said shaft 9 being free to slide and rotate within the bearing. The housing 11 is closed at its outer end, which is fitted with an adjustable screw-stop 14 against which the shaft extension 9 impinges when the pinion is thrown out of gear, the adjustment of the screw 14 thus determining the amount of clearance between the pinion 5 and gear ring 6 in the out-of-gear position. A lubricator or oil-cup 15 is fitted to the bearing housing, and the spindle extension 9 is drilled axially, at 16, so that oil can find its way, through passage 16 and recess 17 containing spring 18, to the helical members 2, 3.

The friction created by the bush 10 assists the inertia of the pinion to cause the longitudinal traversing movement of the latter.

Having fully described my invention, what I desire to claim and secure by Letters Patent is:—

1. In an engine starter, the combination with a motor, of a hollow shaft driven by the motor, a spindle carrying a pinion and engaged with the hollow shaft, said shaft and spindle having engaging helical gear elements adapted to cause longitudinal motion of the pinion by the rotation of the hollow shaft, a spindle extension carried by the outer end of the pinion, and a bearing for the spindle extension inclosed within a housing carried by the casing of the motor, said housing having a closed outer end and being fitted with a lubricator, and the pinion and spindle extension being drilled to provide an oil-way between said bearing housing and the helical gear elements.

2. In an engine starter, the combination with a motor, of a helical shaft driven by the motor, a spindle carrying a pinion and engaged with the hollow shaft, said shaft and spindle having engaging helical gear elements adapted to cause longitudinal motion of the pinion by the rotation of the hollow shaft, a spindle extension carried by the outer end of the pinion, and a bearing for the spindle extension inclosed within a housing carried by the casing of the motor, said housing having a closed outer end fitted with an adjustable screw stop coöperating with the spindle extension.

In testimony whereof I have hereunto set my hand in presence of two subscribing witnesses.

WILLIAM HOLT.

Witnesses:
W. S. SKERRETT,
H. O. PRATT.